(12) United States Patent
Cripe

(10) Patent No.: US 9,018,926 B1
(45) Date of Patent: Apr. 28, 2015

(54) SOFT-SWITCHED PFC CONVERTER

(71) Applicant: David W. Cripe, Mount Vernon, IA (US)

(72) Inventor: David W. Cripe, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 265 days.

(21) Appl. No.: 13/690,070

(22) Filed: Nov. 30, 2012

(51) Int. Cl.
G05F 1/56 (2006.01)
G05F 3/02 (2006.01)
G05F 1/575 (2006.01)

(52) U.S. Cl.
CPC .......................................... *G05F 3/02* (2013.01)

(58) Field of Classification Search
USPC ........................... 323/901, 908, 266, 271–290
See application file for complete search history.

(56) References Cited

U.S. PATENT DOCUMENTS

| | | | | |
|---|---|---|---|---|
| 5,608,295 A * | 3/1997 | Moisin | ........................... | 315/247 |
| 7,315,160 B2 * | 1/2008 | Fosler | ........................... | 323/285 |
| 7,706,161 B2 * | 4/2010 | Quazi | ........................... | 363/89 |
| 8,102,164 B2 * | 1/2012 | Colbeck et al. | ........................... | 323/282 |
| 8,248,051 B2 * | 8/2012 | Colbeck et al. | ........................... | 323/282 |

* cited by examiner

*Primary Examiner* — Adolf Berhane
*Assistant Examiner* — Nusrat Quddus
(74) *Attorney, Agent, or Firm* — Angel N. Gerdzhikov; Donna P. Suchy; Daniel M. Barbieri

(57) ABSTRACT

A PFC circuit has inductive elements and a capacitor between a source node of a first transistor and the second node of a second transistor. The capacitor is configured to resonate at a frequency approximately half that of the switching frequency of the transistors. Furthermore, the inductive element is configured to charge the drain-source voltage of the transistors.

17 Claims, 3 Drawing Sheets

US 9,018,926 B1

SOFT-SWITCHED PFC CONVERTER

FIELD OF THE INVENTION

The present invention is directed generally toward PFC converters, and more particularly to pulse-width modulated PFC converters.

BACKGROUND OF THE INVENTION

Requirements for power factor correction (PFC) of high power, single-phase or multi-phase alternating current systems are increasing due to the importance of power quality. Typically, the topology selected for active PFC circuitry has been a boost-converter circuit. The stresses on the switching devices utilized in these converters are exacerbated by the recovery current through the diodes operating in conjunction with the switches. This typically limits the switching frequency of PFC circuitry to mid tens-of KHz, which prevents any reduction in size of inductors or capacitors in the electromagnetic interference filtering or power conversion circuitry that might be attained through an increase in operating frequency.

Consequently, it would be advantageous if a method and apparatus existed that are suitable for PFC conversion in a high power alternating current system operating at a high switching frequency.

SUMMARY OF THE INVENTION

Accordingly, the present invention is directed to a novel method and apparatus for PFC conversion in a high power alternating current system operating at a high switching frequency.

In at least one embodiment of the present invention, a PFC circuit has inductive elements and a capacitor between a source node of a first transistor and the second node of a second transistor. The capacitor is configured to resonate at a frequency approximately half that of the switching frequency of the transistors. Furthermore, the inductive element is configured to charge the drain-source voltage of the transistors.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
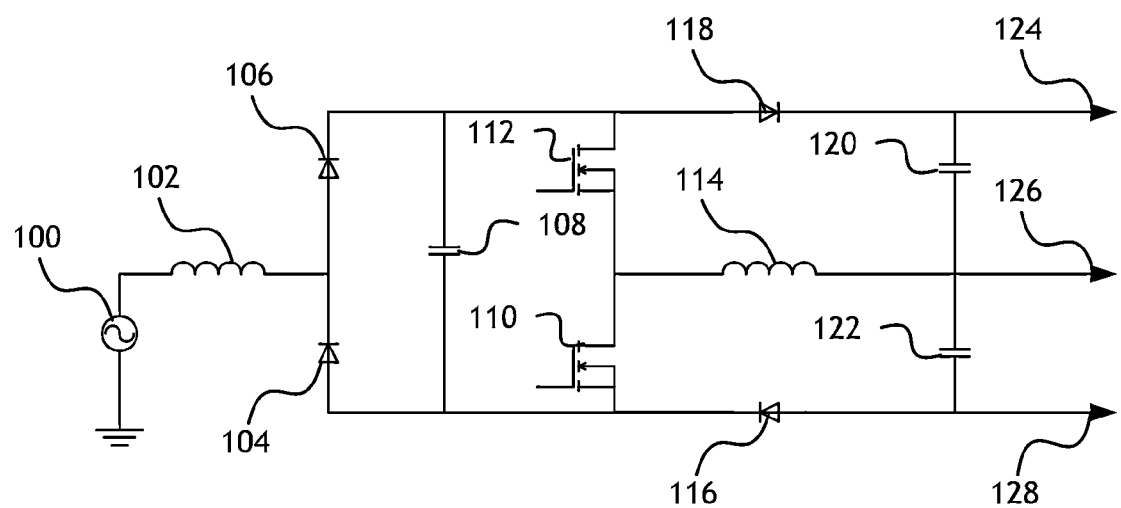
FIG. 1 shows a block diagram of a circuit for implementing at least one embodiment of the present invention.

Referring to FIG. 1, a block diagram of a circuit for implementing at least one embodiment of the present invention is shown. The circuit may include a current source 100. The current source 100 may generate an alternating current at a certain frequency. In at least one embodiment of the present invention, the alternating current may operate at a frequency of approximately 300 kHz. The current source 100 may be connected to a first inductive element 102. The first inductive element 102 may store energy as the current source 100 alternates according to inductance properties of the first inductive element 102.

The first inductive element 102 may be connected to a first serial diode 104 and a second serial diode 106. The first serial diode 104 and second serial diode 106 may be connected in series such that the output node of the first serial diode 104 is connected to the input node of the second serial diode 106. Furthermore, the first inductive element 102 may be connected to the output node of the first serial diode 104 and the input node of the second serial diode 106.

The circuit may include a first capacitor 108. The first capacitor 108 may be connected to the first serial diode 104 and the second serial diode 106 such that the input node of the first serial diode 104 is connected to a first node of the first capacitor 108 and the output node of the second serial diode 106 is connected to a second node of the first capacitor 108. The first capacitor 108 may store energy according to capacitance properties of the first capacitor 108.

The circuit may include a first transistor 110 and a second transistor 112. The first transistor 110 and second transistor 112 may be connected such that the drain node of the first transistor 110 is connected to the source node of the second transistor 112. Furthermore, the source node of the first transistor 110 may be connected to the first node of the first capacitor 108 and the drain node of the second transistor 112 may be connected to the second node of the first capacitor 108. The first transistor 110 and the second transistor 112 may operate in a quasi-half bridge, embedded within a diode-steered boost-converter circuit.

Each of the gate nodes of the first transistor 110 and the second transistor 112 may be connected to a separate, alternating voltage source such that each of the first transistor 110 and the second transistor 112 may be placed in both an "on" state, where a voltage is applied to the gate node, and an "off" state, where the voltage is not applied to the gate node. One or more of the first transistor 110 and the second transistor 112 may be a N-channel MOSFET type transistor.

The circuit may include a second inductive element 114. The second inductive element 114 may store energy according to inductance properties of the second inductive element 114. The second inductive element 114 may be connected to the drain node of the first transistor 110 and the source node of the second transistor 112. The second inductive element 114 may be a small value inductor, placed between the common node of half-bridge switches comprising the first transistor 110 and the second transistor 112, and the center tap voltage of an output energy storage capacitor bank (further described herein).

The first capacitor 108 may function as an energy storage capacitor for the half-bridge switches, 110, 112. The timing of the drive to the half-bridge switches 110, 112 may be sequenced so that the recovery charge of the first serial diode 104 and second serial diode (catch diodes) is recycled losslessly to the first capacitor 108, causing the initial voltage when each of the first transistor 110 and the second transistor 112 are placed in an "on" state to be zero, thereby establishing the conditions necessary for soft-switching.

The circuit may include a first parallel diode 116 and second parallel diode 118. The first parallel diode 116 and second parallel diode 118 may be connected such that the output node of the first parallel diode 116 may be connected to the source node of the first transistor 110 and the input node of the second parallel diode 118 may be connected to the drain node of the second transistor 112. The circuit may also include a second capacitor 120 and a third capacitor 122. The input node of the first parallel diode 116 may be connected to a first node of the third capacitor 122; the output node of the second parallel diode 118 may be connected to a first node of the second capacitor 120; and a second node of the second capacitor 120 may be connected to a second node of the third capacitor 122. The second capacitor 120 and the third capacitor 122 may comprise an output energy storage capacitor bank.

The circuit may have a first output node 124, a second output node 128 and a neutral output node 126. The first output node 124, second output node 128 and neutral output node 126 may be connected to a load circuit (not shown).

In at least one embodiment of the present invention, the circuit shown in FIG. 1 may be employed in a single phase conversion system. In other embodiments of the present invention, a multi-phase conversion system may include one circuit for each phase; for example, a three phase conversion system may include three circuits substantially similar to the circuit shown in FIG. 1, where each phase of the three phase system may correspond to a current source 100.

When the second transistor 112 is in a conduction mode ("on" state), current from the current source 100 may flow through the first inductive element 102, the second serial diode 106, the second transistor 112 and the second inductive element 114. Energy may be stored in the second inductive element 114. In at least one embodiment of the present invention, the second inductive element 114 may have inductive properties substantially smaller that the first inductive element 102.

When the second transistor 112 is not in a conductive mode ("off" state), energy stored in the second inductive element 114 may be transferred through the first transistor 110 to the first capacitor 108. Furthermore, current may flow through the first inductive element 102, second serial diode 106 and the second parallel diode 118 to the second capacitor 120 and the first output node 124. The first output node 124 may be connected to a load circuit.

The first capacitor 108 may have capacitance properties such that the first capacitor 108 resonates. For example, in at least one embodiment the first capacitor 108 may resonate at a frequency half the switching frequency of one or more of the first transistor 110 and the second transistor 112.

When the first transistor 110 is not in a conductive mode ("off" state), the energy stored in the second inductive element 114 charges the drain-source capacitance of the first transistor 110 and the second transistor 112. In at least one embodiment of the present invention, the drain-source capacitance of the first transistor 110 and the second transistor 112 is such that the drain-source voltage of the second transistor 112 is effectively zero at the moment the second transistor 112 is put in an "on" state. Furthermore, the energy stored in the second inductive element 114 may support a voltage across the second parallel diode 118 during reverse recovery, thereby preventing switching stress on the second transistor 112.

In third-quadrant operation, where current flows in the opposite direction as compared to first quadrant operation, the functions of the first transistor 110 and the second transistor 112 may be reversed. The circuit may behave as a voltage boost circuit wherein the first transistor 110 and second transistor 112 may be pulse-width modulated to control line current.

A circuit according to embodiments of the present invention may operate at a switching frequency greater than circuits known in the art. In at least one embodiment, the circuit may operate at a switching frequency ten times greater than circuits known in the art. Furthermore, at least one embodiment of the present invention may have a switching voltage ripple one tenth that of circuits known in the art and corresponding reduction in electromagnetic interference.

Figure 2:
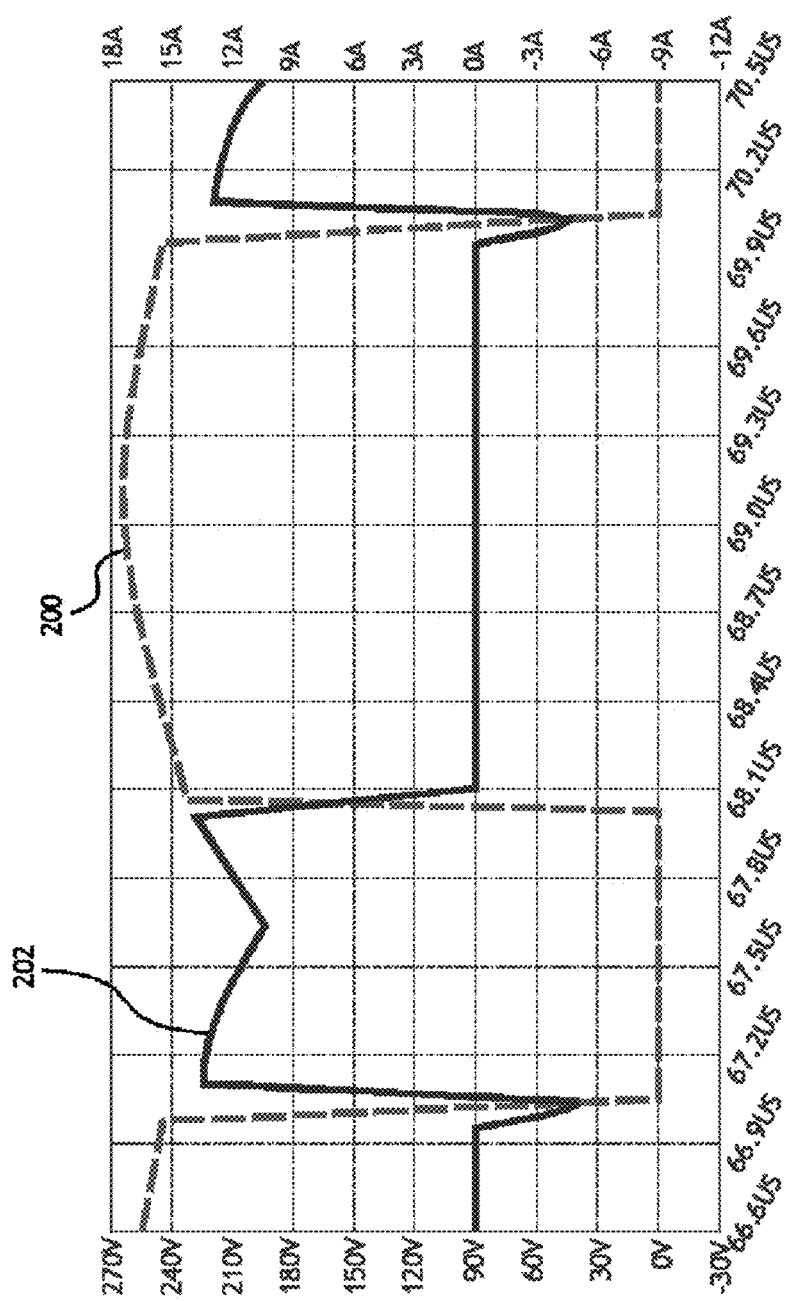
FIG. 2 shows a graph of waveforms produced by at least one embodiment of the present invention.

Referring to FIG. 2, a graph of waveforms produced by at least one embodiment of the present invention is shown. The graph illustrates a voltage waveform 200 and a current waveform 202 of a circuit representing at least one embodiment of the present invention operating at 300 kHz. Specifically, the voltage waveform 200 and current waveform 202 are shown in a span of 3.9 microseconds.

Figure 3:
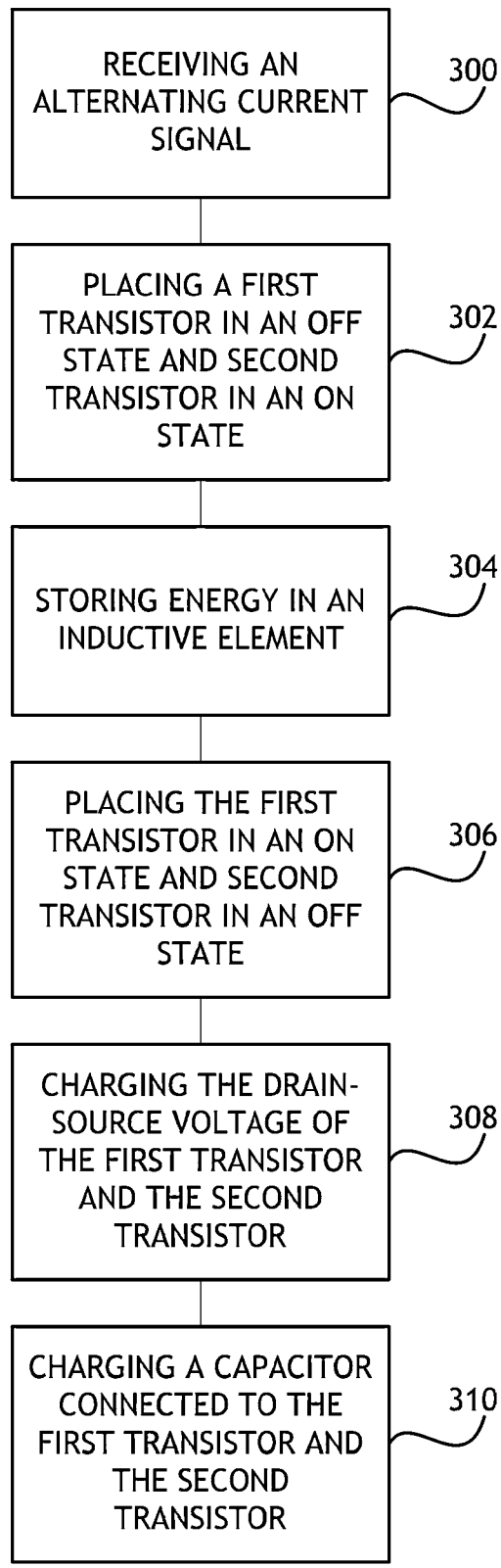
FIG. 3 shows a flowchart of a method for PFC converting a high power alternating current signal at high frequency.

Referring to FIG. 3, a flowchart of a method for PFC converting a high power alternating current signal at high frequency is shown. In at least one embodiment of the present invention, a circuit may receive 300 an alternating current signal. A first transistor may be placed 302 in an off state and a second transistor may be placed 302 in an on state. Energy may be stored 304 in an inductive element. When the first transistor is placed 306 in an on state and the second transistor is placed 306 in an off state, energy from the inductive element may charge 308 the drain-source voltage of the first transistor and the second transistor. In at least one embodiment, a capacitor configured to resonate at approximately half the switching frequency of the first transistor and the second transistor may be charged 310 to cause initial switch voltage of each of the first transistor an the second transistor is substantially zero.

Embodiments of the present invention lead to improvements in SWP-C performance by reducing energy storage requirements of passive components, dissipation of power switches and electromagnetic interference filtering. Additionally, this permits a substantial increase in PFC control loop bandwidth.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A power factor correction circuit comprising:
   a first transistor;
   a second transistor wherein a drain node of the first transistor is connected to a source node of the second transistor;
   a bridge capacitor wherein a first node of the bridge capacitor is connected to a source node of the first transistor and a second node of the bridge capacitor is connected to a drain node of the second transistor;
   a capacitor bank connected to the source node of the first transistor and the drain node of the second transistor;
   an inductive element wherein the inductive element is connected by a first node to the drain node of the first transistor and the source node of the second transistor, and by a second node to the capacitor bank;
a first parallel diode interposed between the capacitor bank and the drain node of the second capacitor; and
a second parallel diode interposed between the capacitor bank and the source node of the first transistor.

2. The circuit of claim 1, wherein at least one of the first transistor and the second transistor are N-channel MOSFET transistors.

3. The circuit of claim 1, further comprising:
a first catch diode; and
a second catch diode,
wherein:
an input node of the first catch diode is connected to the source node of the first transistor;
an input node of the second catch diode is connected to an output node of the first catch diode; and
an output node of the second catch diode is connected to the drain node of the second transistor.

4. The circuit of claim 3, further comprising a current source inductive element wherein a first node of the current source inductive element is connected to the output node of the first catch diode and the input node of the second catch diode.

5. The circuit of claim 4, wherein an inductance of the inductive element is less than half of an inductance of the source inductive element.

6. The circuit of claim 1, wherein the capacitor bank comprises:
a second capacitor; and
a third capacitor,
wherein:
a first node of the first capacitor is connected to the drain node of the second transistor;
a second node of the first capacitor is connected to a first node of the second capacitor;
a second node of the second capacitor is connected to the source node of the first transistor; and
the inductive element is connected to the second node of the first capacitor and the first node of the second capacitor.

7. The circuit of claim 1, wherein the first transistor and the second transistor are configured to have a switching frequency of at least 100 kHz.

8. The circuit of claim 7, wherein the bridge capacitor is configured to resonate at substantially half the switching frequency.

9. A power factor correction apparatus for a multi-phase alternating current system comprising:
a first circuit comprising:
a first transistor;
a second transistor wherein a drain node of the first transistor is connected to a source node of the second transistor;
a bridge capacitor wherein a first node of the bridge capacitor is connected to a source node of the first transistor and a second node of the bridge capacitor is connected to a drain node of the second transistor;
a capacitor bank connected to the source node of the first transistor and the drain node of the second transistor; and
an inductive element wherein the inductive element is connected by a first node to the drain node of the first transistor and the source node of the second transistor, and by a second node to the capacitor bank; and
a second circuit comprising:
a first transistor;
a second transistor wherein a drain node of the first transistor is connected to a source node of the second transistor;
a bridge capacitor wherein a first node of the bridge capacitor is connected to a source node of the first transistor and a second node of the bridge capacitor is connected to a drain node of the second transistor;
a capacitor bank connected to the source node of the first transistor and the drain node of the second transistor; and
an inductive element wherein the inductive element is connected by a first node to the drain node of the first transistor and the source node of the second transistor, and by a second node to the capacitor bank,
wherein:
the first circuit is connected to a first alternating current source having a first phase; and
the second circuit is connected to a second alternating current source having a second phase.

10. The circuit of claim 9, wherein at least one of the first transistor and the second transistor are N-channel MOSFET transistors.

11. The circuit of claim 9, further comprising:
a first catch diode; and
a second catch diode,
wherein:
an input node of the first catch diode is connected to the source node of the first transistor;
an input node of the second catch diode is connected to an output node of the first catch diode; and
an output node of the second catch diode is connected to the drain node of the second transistor.

12. The circuit of claim 11, further comprising a current source inductive element wherein a first node of the current source inductive element is connected to the output node of the first catch diode and the input node of the second catch diode.

13. The circuit of claim 12, wherein an inductance of the inductive element is less than half of an inductance of the source inductive element.

14. The circuit of claim 9, wherein the capacitor bank comprises:
a second capacitor; and
a third capacitor,
wherein:
a first node of the first capacitor is connected to the drain node of the second transistor;
a second node of the first capacitor is connected to a first node of the second capacitor;
a second node of the second capacitor is connected to the source node of the first transistor; and
the inductive element is connected to the second node of the first capacitor and the first node of the second capacitor.

15. The circuit of claim 9, further comprising:
a first parallel diode interposed between the capacitor bank and the drain node of the second capacitor; and
a second parallel diode interposed between the capacitor bank and the source node of the first transistor.

16. The circuit of claim 9, wherein the first transistor and the second transistor are configured to have a switching frequency of at least 100 kHz.

17. The circuit of claim 16, wherein the bridge capacitor is configured to resonate at substantially half the switching frequency.

* * * * *